United States Patent
Harran et al.

(10) Patent No.: US 7,649,998 B2
(45) Date of Patent: Jan. 19, 2010

(54) FACILITATING SECURE DATA COMMUNICATIONS THAT USE KEY-BASED ENCRYPTION

(75) Inventors: Richard Michael Wyn Harran, Hursley (GB); Michael Horan, Hursley (GB); Jonathan Rumsey, Hursley (GB)

(73) Assignee: International Business Machines Corporation, Armonk, NY (US)

(*) Notice: Subject to any disclaimer, the term of this patent is extended or adjusted under 35 U.S.C. 154(b) by 114 days.

(21) Appl. No.: 10/598,509

(22) PCT Filed: Mar. 1, 2005

(86) PCT No.: PCT/EP2005/050895

§ 371 (c)(1),
(2), (4) Date: May 16, 2007

(87) PCT Pub. No.: WO2005/086452

PCT Pub. Date: Sep. 15, 2005

(65) Prior Publication Data

US 2007/0263874 A1    Nov. 15, 2007

(30) Foreign Application Priority Data

Mar. 9, 2004    (GB) ................................. 0405245.2

(51) Int. Cl.
*H04L 9/08*    (2006.01)
(52) U.S. Cl. ........................ 380/283; 380/277; 380/261; 380/273
(58) Field of Classification Search ........................ None
See application file for complete search history.

(56) References Cited

U.S. PATENT DOCUMENTS

| 6,360,269 | B1 * | 3/2002 | Mamros et al. | 709/228 |
| 6,795,555 | B1 * | 9/2004 | Parisien et al. | 380/47 |
| 6,928,551 | B1 * | 8/2005 | Lee et al. | 713/165 |
| 6,956,846 | B2 * | 10/2005 | Lewis et al. | 370/352 |

(Continued)

FOREIGN PATENT DOCUMENTS

EP         0 999 673 A2    5/2000

(Continued)

OTHER PUBLICATIONS

Mraz, Ron, "Secure Blue: An Architecture for Searchable, Reliable High Volume SSL Internet Server," Computer Security Applications Conference, 2001, ASAC 2001, Proceedings 17th Annual 10-14, Dec. 2001 pp. 391-398.

(Continued)

*Primary Examiner*—William R Korzuch
*Assistant Examiner*—Michael R Vaughan
(74) *Attorney, Agent, or Firm*—Kunzler & McKenzie

(57) ABSTRACT

There is disclosed a method, apparatus, computer program and computer program product for facilitating secure data communications. The secure data communications is carried out using a secret key for encrypting data flowing between first and second entities over a communications link. First it is determined that the communications link has been idle. Once it is determined that there is now data to flow over the previously idle communications link, the generation of a new secret key is initiated. This new secret key is then used for encrypting data sent between the first and the second entities over the communications link.

13 Claims, 2 Drawing Sheets

U.S. PATENT DOCUMENTS

| | | | |
|---|---|---|---|
| 6,976,071 B1 * | 12/2005 | Donzis et al. | 709/224 |
| 7,127,742 B2 * | 10/2006 | Kramer et al. | 726/15 |
| 7,181,016 B2 * | 2/2007 | Cross et al. | 380/281 |
| 7,382,883 B2 * | 6/2008 | Cross et al. | 380/281 |
| 2003/0223587 A1 * | 12/2003 | Nishi | 380/284 |
| 2003/0229779 A1 * | 12/2003 | Morais et al. | 713/153 |
| 2004/0078601 A1 * | 4/2004 | Tengwall et al. | 713/201 |
| 2005/0015583 A1 * | 1/2005 | Sarkkinen et al. | 713/150 |
| 2005/0025315 A1 * | 2/2005 | Kreitzer | 380/270 |

FOREIGN PATENT DOCUMENTS

EP        1122930 A2 *   8/2001

OTHER PUBLICATIONS

International Search Report; PCT/EP2005/050895, mailed Jun. 28, 2005, received by attorney submitting report Apr. 27, 2009.
Communication pursuant to Article 96(2) EPC EPO; Application 05 729 606.3-1244; Ref. GB920040005EP1; mailed Jul. 25, 2007, received Jul. 30, 2007, received by attorney submitting report Apr. 27, 2009.

* cited by examiner

FACILITATING SECURE DATA COMMUNICATIONS THAT USE KEY-BASED ENCRYPTION

BACKGROUND

1. Field of the Invention

The invention relates to encryption and more particularly to the renegotiation of keys used for encryption.

2. Description of the Related Art

Individuals and businesses alike use computers to transmit and receive a variety of data. A reasonable proportion of such data is likely to be sensitive and thus ensuring data privacy is important.

One popular way of achieving data privacy is through the use of an encryption algorithm. Such algorithms are typically key-based and are either classed as symmetric or asymmetric.

Symmetric encryption algorithms make use of a secret key which is known only to the sender and the receiver of the data in question. The same secret key is used to encrypt the data at the sender as is used to decrypt the data when it is received by the receiver.

Asymmetric encryption algorithms on the other hand employ both a public key and secret key (secret key). The public key can be known to anybody whilst the secret key in known only to a limited number of entities. One key is used to encrypt the data, whilst the other key permits decryption of the data.

Secure Sockets Layer (SSL) is a protocol for achieving secure data transmission over the Internet. SSL employs both asymmetric and symmetric encryption techniques.

A pair of asymmetric keys is used in an initial authentication handshake between two parties (e.g. Alice and Bob). In the following example, Alice wishes to authenticate Bob (of course Bob may also want to authenticate Alice—this is advisable). Bob has a public-secret key pair. Bob's public key is disclosed to Alice. Alice transmits a message to Bob which Bob then encrypts with his secret key and returns to Alice. Alice decrypts the message from Bob using the public key that Bob disclosed to her earlier. If the decrypted message matches the message that Alice originally sent to Bob, then Alice can assume that Bob is who he says he is. SSL however also uses digital signatures to prevent a third party from obtaining Alice's original message and impersonating Alice. SSL also makes use of certificates. A certificate is used to prove that a public key really does come from, for example, Bob.

Having authenticated Bob, Alice is now ready to exchange data with Bob. Before data exchange can however take place, Alice and Bob must agree upon a symmetric (secret) key. The data to be exchanged is first encrypted with this secret key. Since both parties have agreed upon the secret key, Alice can encrypt her data using the key whilst Bob can decrypt data received from Alice.

It will be appreciated that if the secret key is discovered by an unauthorised third-party, it can be used to decrypt data and to encrypt spoof messages/alter data.

It is for this reason that it is preferable to periodically renegotiate the SSL secret key used by Alice (client) and Bob (server) to exchange data. The renegotiation of the secret key involves performing a CPU intensive handshake on both the client and server. This is especially processor intensive when each renegotiation involves a full asymmetric authentication followed by the negotiation of a symmetric secret key.

Current Solutions

Current secret key renegotiation implementations generally use one of two methods:

(i) timed reset in which a renegotiation is initiated by the SSL client every x minutes (e.g. a web browser may initiate a key renegotiation every 2 minutes); or (ii) initiation after a certain threshold of bytes has flowed.

These solutions do not however work efficiently in a messaging environment since in such an environment a communications link typically fluctuates between idle and busy. The solutions mentioned above are especially inefficient where a communications link is particularly idle or busy at varying times of day (as is likely in a messaging environment).

Problems with Current Solutions (i) Timed Renegotiation—Idle Communications Link There could be an unnecessary number of full authentications and renegotiations when no data (messages) has been sent over the communications link for a prolonged period of time. In other words, a client may needlessly often authenticate a server with which it wants to communicate and then renegotiate a secret key with that server. Thus performance is degraded unnecessarily.

(ii) Byte Threshold Implementation—Idle Communications Link

This solution increases the period of time in which a secret key is valid on an idle link and gives a hacker more time to attack the secret key and send 'spoof' messages without detection.

(iii) Timed Negotiation—Busy Communications Link

A busy communications link will flow a large amount of data encrypted with the same secret key. Whilst the hacker is unlikely to be able to break the key in the sort of times generally used for timed renegotiation, the problem however is that he will be able to record the encrypted data and then analyse it at his leisure. This is easier for him if large amounts of the data are encrypted with the same secret key and thus the security of a large amount of data may be compromised using this solution when the communications link is busy.

(iv) Byte Threshold Implementation—Busy Communications Link

The amount of data encrypted with the same secret key on a busy communications link will be minimised. Thus this solution minimises the amount of data encrypted with a single secret key. However this solution is not good, when the link is predominantly idle (see above).

Thus encryption in an environment that fluctuates between being busy and being idle has thus far been problematic.

SUMMARY OF THE INVENTION

According to one aspect there is provided a method for facilitating secure data communications using a secret key for encrypting data flowing between first and second entities over a communications link, the method comprising: determining that the communications link has been idle; determining that there is now data to flow over the previously idle communications link; and responsive to determining that there is now data to flow over the previously idle communications link, initiating generation of a new secret key, the new secret key for encrypting data sent between the first and second entities over the communications link.

In this way key generation only occurs when transmission over an idle communications link is about to recommence. This is contrary to the prior art in which key generation may occur on a timed basis.

Preferably it is also possible to determine when a preconfigured amount of data has been sent over the communications link. Once the preconfigured amount has been sent over the link, then generation of a new secret key is preferably initiated.

This caters for the situation in which the communications link is not predominantly idle. Thus even on a busy link, key generation occurs at frequent enough intervals.

In one embodiment the communications link must have been idle for at least a predetermined amount of time before the generation of the new secret key is initiated as a result of a determination that there is now data to flow over the link.

In this way, short periods of idleness do not immediately cause the initiation of the process for generating a new secret key.

Note, a simple timeout system could be used which says that if the link has been idle for at least x seconds and there is now data to flow, then a new secret key should be generated.

In a preferred embodiment, once it is determined that the communications link has been idle for a predetermined period of time, the second entity is informed that the first entity is still present via a heartbeat.

In this way, the second entity is aware that the first entity is still alive even though the second entity currently has no data to flow over the communications link. Note, the first entity may send more than one heartbeat to the second entity (i.e. if the link is idle for long enough).

The second entity preferably confirms receipt of a heartbeat from the first entity.

In one embodiment, if no confirmation of receipt of a heartbeat is received by the first entity within a predetermined amount of time, then communication by the first entity with the second entity is terminated. This is because either the second entity has failed, or a third party is consuming the heartbeats/responses to the heartbeats.

In another embodiment, if no confirmation of receipt of a heartbeat is received by the first entity within a predetermined amount of time, then the generation of a new secret key is initiated before it is permissible for data to be transmitted again by the first entity to the second entity. Of course, unless the process also includes authentication (see later), a third party could pretend to be the second entity and thus be involved in the key generation process.

In a preferred embodiment, it is possible to determine that the communications link has been idle enough to cause the first entity to send a heartbeat to the second entity. Preferably responsive to determining that the link has been idle enough to cause the first entity to send a heartbeat to the second entity, generation of a new secret key is initiated.

In a preferred embodiment, authentication of at least the second entity is initiated prior to initiation of generation of a new secret key.

Generation of a new secret key is preferably as a result of a negotiation process carried out between the first and the second entity.

According to another aspect, there is provided a method for facilitating secure data communications using a secret key for encrypting data flowing between first and second entities over a communications link, the method comprising: determining that the communications link has been idle; and responsive to determining that the communications link has been idle, ignoring data encrypted with the secret key.

Preferably only subsequent data encrypted with a newly generated secret key is accepted.

Preferably the communications link must be idle for at least a predetermined amount of time. Preferably this is indicated via the receipt of a heartbeat from the first entity.

In accordance with one embodiment, when it is determined that the communications link has been idle for at least a predetermined amount of time and that no heartbeat has been received from the first entity, communication with the first entity is terminated.

This is because it is assumed that either the first entity has failed or that a third-party is consuming the heartbeats.

In another embodiment, responsive to determining that the communications link has been idle for at least a predetermined amount of time and that no heartbeat has been received from the first entity, only subsequent data encrypted with a newly generated secret key is accepted.

According to another aspect, there is provided an apparatus for facilitating secure data communications using a secret key for encrypting data flowing between first and second entities over a communications link, the apparatus comprising: means for determining that the communications link has been idle; means for determining that there is data to flow over the previously idle communications link; and means, responsive to determining that there is data to flow over the previously idle communications link, for initiating generation of a new secret key, the new secret key for encrypting data sent between the first and the second entities over the communications link.

According to another aspect, there is provided an apparatus for facilitating secure data communications using a secret key for encrypting data flowing between a first and a second entity over a communications link, the apparatus comprising: means for determining that the communications link has been idle; and means, responsive to determining that the communications link has been idle, for ignoring data encrypted with the secret key.

Preferably data encrypted with the secret key is ignored in the sense that it is not considered safe to trust the integrity of the data. Thus preferably only data encrypted with a newly generated secret key is accepted as trustworthy.

It will be appreciated that the invention may be implemented in computer software.

BRIEF DESCRIPTION OF THE DRAWINGS

A preferred embodiment of the present invention will now be described, by way of example only, and with reference to the following drawings.

DETAILED DESCRIPTION

Figure 1A:
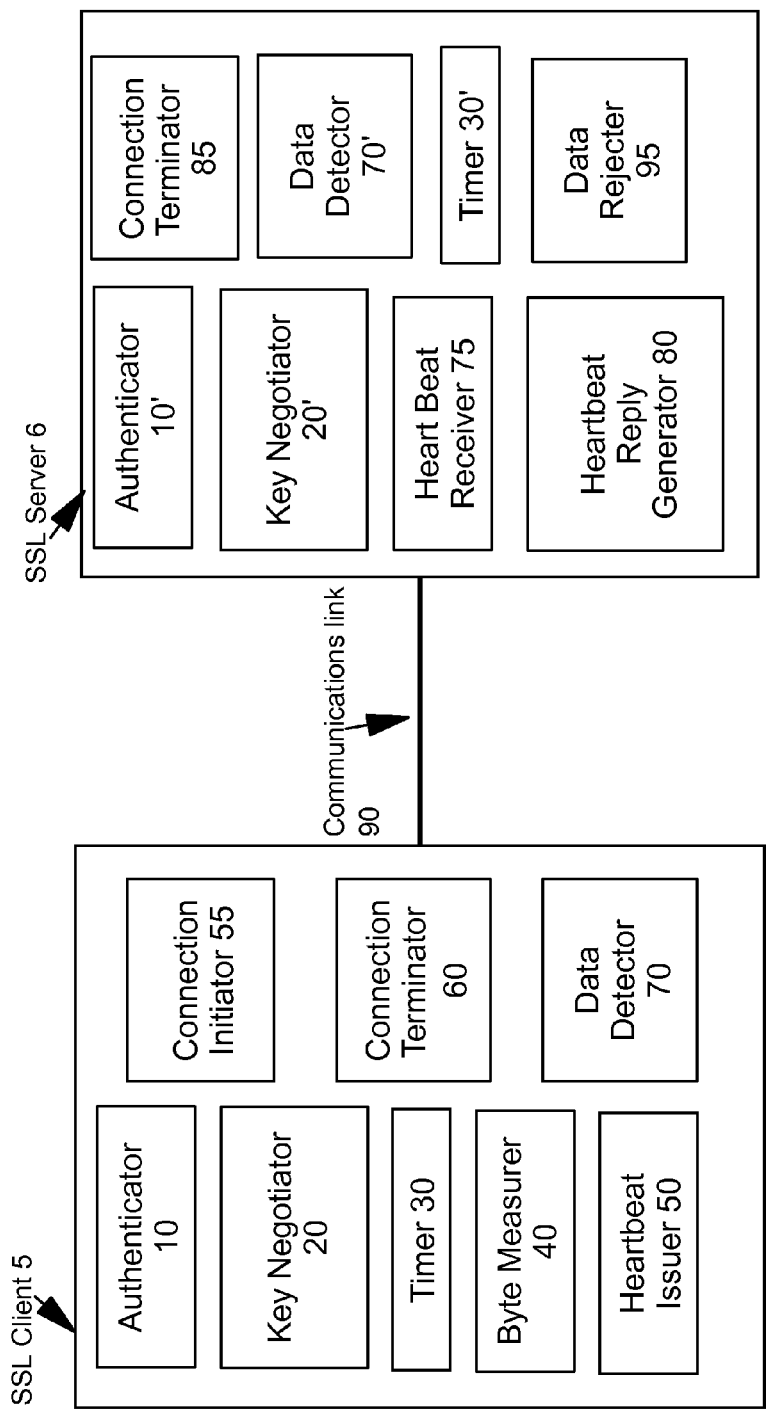
FIG. 1a illustrates a client-server component diagram in accordance with a preferred embodiment of the present invention.

A preferred embodiment of the present invention will now be described with reference to FIGS. 1a and 1b. The two figures should be read in conjunction with one another.

An SSL client 5 desires to transmit data to an SSL server 6. First the SSL client initiates a connection with the server via communications link 90 using connection initiator 55. Client 5 then authenticates server 6 using authenticator 10 which communicates with an equivalent component 10' on the server (step 100).

Having authenticated the server 6, the client and server negotiate a symmetric secret key via key negotiator components 20, 20' (step 110). This secret key is subsequently used to encrypt and decrypt messages that the client flows across the communications link 90.

A data detector 70 on the client works to detect whether the client 5 has any data to flow over communications link 90 (step 120). If there is data to flow over the link, then it is detected at step 130 whether the link was previously idle enough to result in the client sending a heartbeat to the server (see later).

Assuming that this is not the case then this data is encrypted with the current secret key and is sent (not shown). It is determined via byte measurer 50 (step 150) whether a pre-configured number of bytes have been sent. If the answer is no, then the process loop round to step 120 to see whether there is more data to be flowed.

If a pre-configured number of bytes has been sent (as detected by byte measurer 40), then it is time to re-authenticate and re-negotiate the key (steps 100, 110) using components 10, 10', 20, 20'. At this point a number of bytes sent value held by byte measurer 40 is reset to zero.

The configurable byte threshold ensures that the amount of data sent on a busy communications link with the same secret key is limited since the secret key will be renegotiated regularly as a result of the byte threshold being met. Thus the amount of data encrypted with the same secret key is minimised.

Note the setting of an appropriate byte threshold is a trade-off:

The lower the threshold, the more often re-authentication is performed and the secret key is changed—thus the more processing power involved. However the more often re-authentication is performed and the secret key is changed, the more secure the data flowing over the communications link is; and The higher the threshold is, the better the performance (due to fewer re-authentications and secret key renegotiations). Of course the data flowing over the communications link is less secure than in an environment in which the threshold is lower.

A timer 30 is used by the data detector component 70 to determine when the communications link 90 has been idle for a configurable period of time. If this is the case, it issues (via the heartbeat issuer 50) a special 'heartbeat' message to confirm to the SSL server 6 that it is still present (step 160). (The timer is then reset to zero—note the timer is also preferably set to zero when re-authentication is initiated). The client waits for a reply to the heartbeat (step 170) from the server (heartbeat receiver 75, heartbeat reply generator 80)—see later.

Note, the configurable period of time is preferably not too short (e.g. 10 seconds) since this could result in numerous heartbeats (i.e. too much unnecessary traffic). The time chosen depends on the environment—a period of 5 minutes might for example be appropriate.

After the SSL server has received one or more 'heartbeat' messages it will reject as 'spoofs' any other messages containing application data encrypted with the same secret key (data rejecter component 95). Upon detection of spoof data an appropriate action(s) should then be taken such as logging this with an administrator and closing the connection with the client.

For the SSL client to send a new message to the SSL server (which has received a heartbeat indicating that the communications link was previously idle) it must first renegotiate a new secret key before sending the message to avoid the SSL server rejecting it as a 'spoof' (steps 120, 130, 100 and 110). Thus there should be no security exposure after a period of idleness.

As discussed above, spoof data sent after a period of idleness preferably causes the server to terminate the connection with the client. The client can then choose to resume its connection with the server and has to re-authenticate and re-negotiate prior to sending any more data to the server.

Note, since heartbeats do not contain any useful data, they do not have to be encrypted.

If the SSL server does not receive a 'heartbeat' when it detects (via data detector component 70' and timer component 30') that the link has been idle for greater than the configurable period of time (i.e. the same period of time as used by client 5), then the SSL server closes its connection via connection terminator 85. This prevents a hacker from consuming 'heartbeat' messages to prevent a secret key renegotiation to extend the lifetime of the secret key.

Note, there is no need to detect spoof heartbeats since they do not compromise any application data.

If the SSL server 6 is present and has received a heartbeat from the client then it replies to the special 'heartbeat' message and remembers that the connection has been idle for long enough for a heartbeat to flow across the communications link. The SSL client can send any number of 'heartbeat' messages to confirm that it is still present.

Note the 'heartbeat' message does not contribute to the byte total used in calculating when a secret key should be triggered by the byte threshold.

Figure 1B:
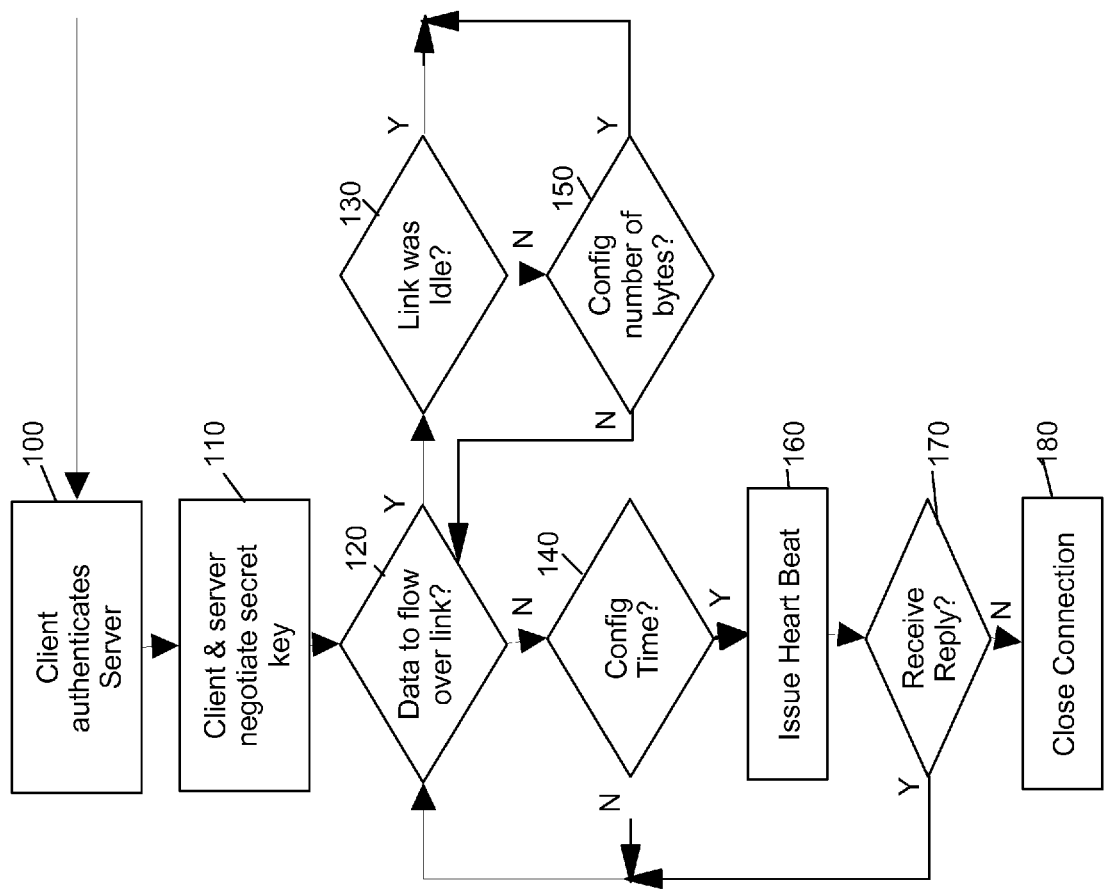
FIG. 1b is a flow chart of the processing performed by the client in accordance with a preferred embodiment of the present invention.

Once the client has received a reply from the server, the process of FIG. 1b loops round to step 120. If it is determined that there is now data to flow over the link, then it is again tested at step 130 whether the link was previously idle enough to cause the generation of a heartbeat. If the answer is yes, then the secret key should be renegotiated. The client will not therefore send any more data to the server until re-authentication and key negotiation has been effected.

This means that if a hacker has managed to break the secret key due to the prolonged period during which the communications link was idle, that key is now no use to them.

If no reply is received then the client closes its connection using connection terminator 55 (step 180). This is because a failure to reply indicates that either the server is no longer present or someone else is consuming the server's replies.

Note, in an alternative embodiment, the client may attempt to contact the server an additional number of times before terminating the connection. This is because the lack of response from the server could just be a temporary problem. To be on the safe side, re-authentication/key negotiation could be initiated.

Note, the timing between heartbeats (when more than one is sent on an idle link) is preferably constant. If random timing is used between each heartbeat message, then it would not be possible to predict when a heartbeat was overdue (quite possibly consumed by a hacker).

It will of course be appreciated that the time before a heartbeat is first sent (and intervals between heartbeats) and byteflow counts are preferably chosen so that the same secret key does not remain in use for a prolonged period. Note, a "spoof" message could still be achievable if the chosen values are high enough to provide a hacker with the time to capture and discover the secret key. However once a heartbeat triggered secret key renegotiation occurs, the hacker will be unable fool the server any longer. For this reason, it is preferably for the data sending side to initiate the negotiation of a new key. Otherwise, if the server is receiving spoof messages correctly encrypted, from the server's point of view re-negotiation is not required.

There are four key advantages of using the solution thus far described;

(i) The proposal ensures that re-authentication and renegotiation of the secret key is only issued when absolutely necessary on idle communications links to achieve optimum performance whilst remaining secure.

(ii) The ability to detect a 'spoof' message even though it has been encrypted with the correct secret key is provided through the use of 'heartbeat' messages—since the secret key is renegotiated when data communication is resumed;

(iii) The proposal ensures the secret key is changed regularly on a busy communications link to limit the amount of application data that could be read by a hacker with a compromised secret key; and (iv) The special 'heartbeat' messages do not contain application data and hence are useless to a hacker even though the secret key used to encrypt & decrypt the data could be discovered through brute force This protocol preferably ensures that authentication and key negotiation is always carried out after the communications link has been idle for a period long enough such that one or more heartbeats have flowed across the link and when a certain number of bytes have flowed across the communications link.

A hacker sending a 'spoof' message, even though he may have discovered the current agreed secret key, cannot follow the agreed protocol as he does not possess the asymmetric secret key for initiating a re-authentication (of the client) and key negotiation (neither does he have the certificate for re-authentication). Further the old symmetric secret key is invalid from the moment the server sees a heartbeat from the client.

This solution effectively prevents a hacker from sending 'spoof' messages on an idle communications link without the need to unnecessarily perform re-authentication, key negotiation. This solution also copes with a busy communications link.

Note it is possible to configure SSL such that the SSL client doesn't need to present authentication information to the SSL server in order for a successful re-authentication to take place—in this case only the server is authenticated to the client, not the other way round. However this is not advisable in a secure peer-to-peer environment since it would enable a third-party to pretend to be the client and to communicate with the server as such.

Note, whilst the present invention has been described as particularly applicable to the messaging environment, no limitation to such is intended. The invention is applicable to any environment which fluctuates between idle and busy periods.

Further, whilst the invention has been described in terms of the SSL encryption protocol, once again no such limitation is intended. The invention is however particularly applicable to any environment where authentication and key negotiation is processor intensive. Another example is TLS.

Note, in the exemplary embodiment, data is flowing from the client to the server. This does not have to be the case—data may flow in the opposite direction. Preferably whoever is sending data initiates authentication and key negotiation and also sends heartbeats.

In an alternative embodiment, authentication and key renegotiation is always initiated by the SSL client. Thus if the SSL server has data to send, the server asks the SSL client to authenticate and renegotiate first. The opposite could also be true.

Note, whilst the preferred embodiment has been described in terms of performing on each occasion an initial full handshake (asymmetric authentication) and then negotiation of the secret key, this does not have to be the case. The invention is especially applicable in this situation since authentication followed by key negotiation is particularly processor intensive. However the invention is also preferably applicable in an environment which uses session caching (less processor intensive). This is a feature that is available in, for example, SSL v3.0 and TLS.

Session caching can be carried out during the initial handshake. The client and the server save a common session ID, the master secret key and some certificate chains. This information is held in a cache usually for a configurable period of time.

If a subsequent handshake is requested (i.e. when the client requests a new secret key) and this information has not expired from the cache, both sides present each other with their session IDs. If the session IDs match then the cached information will be used to reduce the processing carried out during the handshake—this is commonly referred to as an abbreviated handshake as opposed to a full handshake.

Note, the weakness with using session caching is that a hacker need only present the original session ID when responding to a handshake (no certificates are swapped and no public key operations take place). The session ID is included in a client "hello" flow so could be snooped off the wire.

Note, data does not have to flow in one direction only—data may flow in both directions. In this scenario, whoever has data to send when secret key renegotiation becomes necessary preferably initiates the secret key renegotiation. One of the two ends is preferably specified as being responsible for sending heartbeats (i.e. after no data has flowed in either direction for at least a predetermined amount of time). Heartbeats and responses thereto are thus used to determine the presence of both ends. The byte count used is preferably the sum total of all data sent over the communications link during a particular time period—i.e. includes data sent by both ends. In one embodiment, one end keeps track of the byte count and the idleness of the link and informs the other end when either of the two thresholds are met.

The invention claimed is:

1. A method for facilitating secure data communications using a secret key for encrypting data flowing between first computing node comprising a processor and a memory and second computing node over a communications link, the method comprising:

determining that the communications link has been idle for at least a predetermined period of time, the communications link intermittently fluctuating between idle and busy, the idle communication link having no secure data transmission within the at least a predetermined period of time;

determining that there is secure data to flow over the idle communications link between the first computing node and the second computing node; and generating a new secret key on demand exclusively in response to determining that there is secure data to flow over the idle communications link and in response to determining that the communication link has been idle for at least the predetermined period of time, wherein the new secret key serves to encrypt the secure data sent between the first computing node and the second computing node over the communications link.

2. A method performed at a first computing node comprising a processor and a memory for facilitating secure data communications by using a secret key for encrypting data flowing between said first computing node and a second computing node over a communications link, the method comprising:
   determining that the communications link has been idle for at least a predetermined period of time, the communications link intermittently fluctuating between idle and busy, the idle communication link having no secure data transmission within the at least a predetermined period of time;
   determining that secure data is available for flow over the idle communications link between the first computing node and the second computing node; and
   generating a new secret key on demand before transmission over the idle communications link recommences, in response to a determination that secure data is available and a determination that the communications link has been idle for at least the predetermined period of time, the new secret key for use in encrypting at least part of the secure available data before the secure available data flows onto the communications link.

3. The method of claim 2 including the additional steps of:
   determining whether the amount of secure data sent over the communications link since the last generation of a secret key exceeds a predetermined amount threshold; and
   if the amount of secure data sent exceeds the predetermined amount threshold, initiating generation of a new secret key.

4. The method of claim 2 including the additional steps of: sending a heartbeat message to the second computing node only if it is determined that the link has been idle for at least the predetermined period of time and that there is no secure data available for flow over the communications link; and
   monitoring the communications link for receipt of an acknowledgement from the second computing node.

5. The method of claim 4 including the additional step of terminating the communications link with the second computing node if no acknowledgement is received from the second computing node within a predetermined period of time.

6. An apparatus for facilitating secure data communications by using a secret key to encrypt data flowing over a communications link between the apparatus and a remote system, said apparatus comprising:
   a data detector for determining whether the communications link has been idle for at least a predetermined period of time using a timer, the communications link intermittently fluctuating between idle and busy, the idle communication link having no secure data transmission within the at least a predetermined period of time, the data detector determining that data is now available for flow to the remote system over the communications link;
   key generation logic for generating a new secret key on demand in response to determinations that the communications link has been idle for at least the predetermined period of time and there is secure data now available for flow to the remote system, the new secret key for use in encrypting at least part of the secure available data before the secure available data flows onto the communications link; and
   a byte measurer for determining whether the amount of secure data sent over the communications link has exceeded a predetermined amount threshold since the last generation of a secret key and
   wherein the key generation logic initiates generation of a new secret key if the determination is that the amount of secure data sent has exceeded the predetermined amount threshold.

7. The apparatus of claim 6 further including a heartbeat issuer for sending a heartbeat to the remote system if the data detector determines that the communications link has been idle but there is no secure data available for flow to the remote system over the communications link.

8. The apparatus of claim 7 further including a detector for monitoring the communications link for an acknowledgment of the heartbeat from the remote system.

9. The apparatus of claim 8 further including a connection terminator for terminating the communications link if the detector fails to detect an acknowledgment of the heartbeat from the remote system within the predetermined period of time.

10. A program product comprising a computer readable storage media embodying program instructions executed by a computer to facilitate secure data communications with a remote system by using a secret key for encrypting data flowing between the computer and the remote system over a communications link by:
   determining that the communications link has been idle for at least a predetermined period of time, the communications link intermittently fluctuating between idle and busy, the idle communication link having no secure data communication traffic within the at least a predetermined period of time;
   sending a heartbeat message to the remote system only if it is determined that the link has been idle for at least a predetermined period of time and that there is no secure data available for flow over the communications link;
   monitoring the communications link for receipt of an acknowledgement from the remote system;
   receiving the acknowledgement from the remote system within a predetermined period of time;
   determining that secure data is available for flow over the idle communications link from the computer to the remote system;
   detecting that a heartbeat flowed across the idle communications link; and
   generating a new secret key on demand exclusively in response to a determination that secure data is available for flow over the idle communications link, detecting that a heartbeat flowed across the idle communications link, and receiving the acknowledgement from the remote system within the predetermined period of time, the new secret key for use in encrypting at least part of the secure available data before the secure available data flows onto the communications link, such that generation of a new secret key exclusively occurs when secure data is available for flow over the idle communications link.

11. The program product of claim 10 farther including program instructions for generating a new secret key only if the communications link is found to have been idle for at least the predetermined period of time.

12. The program product of either claim 10 or claim 11 including additional program instructions for:
   determining whether the amount of secure data sent over the communications link since the last generation of a secret key exceeds a predetermined amount threshold; and initiating generation of a new secret key if the amount of secure data sent is determined to have exceeded the predetermined amount threshold.

13. The program product of claim 10 including an additional program instruction for terminating the communications link with the remote system if no acknowledgement is received from the remote system within the predetermined period of time.

* * * * *